United States Patent
Paget

[19]

[11] Patent Number: 5,957,037
[45] Date of Patent: Sep. 28, 1999

[54] HEAT EXCHANGE APPARATUS

[75] Inventor: Anthony John Paget, Brighouse, United Kingdom

[73] Assignee: Yorkshire Process Plant Limited, Brighouse, United Kingdom

[21] Appl. No.: 09/117,693

[22] PCT Filed: Apr. 29, 1997

[86] PCT No.: PCT/GB97/00246

§ 371 Date: Aug. 4, 1998

§ 102(e) Date: Aug. 4, 1998

[87] PCT Pub. No.: WO97/28703

PCT Pub. Date: Aug. 14, 1997

[30] Foreign Application Priority Data

Feb. 6, 1996 [GB] United Kingdom .................... 9602306

[51] Int. Cl.⁶ ................. A23L 3/32; A23G 1/18; A23G 3/04; A23G 7/00
[52] U.S. Cl. ................. 99/326; 99/348; 99/453; 99/483; 99/486; 165/232; 165/267
[58] Field of Search ............ 99/348, 326, 353–355, 99/517, 452–455, 460–466, 483, 485, 486; 62/354; 165/80.1, 64, 94, 109.1, 232, 267; 366/75, 85, 144–146; 426/231, 519, 631, 660, 524

[56] References Cited

U.S. PATENT DOCUMENTS

| | | | |
|---|---|---|---|
| 2,909,985 | 10/1959 | Abrams | 99/483 X |
| 4,648,315 | 3/1987 | Blum | 99/455 |
| 4,892,033 | 1/1990 | Sollich | 99/517 X |
| 5,514,390 | 5/1996 | Aasted | 426/231 |
| 5,525,364 | 6/1996 | Haslund | 426/519 X |

*Primary Examiner*—Timothy F. Simone
*Attorney, Agent, or Firm*—Harrison & Egbert

[57] ABSTRACT

A heat exchange apparatus for use in the production of sugar confectionery or for tempering chocolate including a vessel with a tubular heat transfer surface. The vessel defines an inlet and outlet higher than the inlet. Heat exchangers, such as steam jackets and modulating valves are provided for supplying heat to or removing heat from the heat transfer surface. A shaft is located longitudinally along the length of the vessel and is provided with at least one piston. The shaft is reciprocated in the vessel so that the product is agitated and substantially the entire heat transfer surface of the vessel is swept by the piston during each reciprocation cycle.

15 Claims, 2 Drawing Sheets

HEAT EXCHANGE APPARATUS

TECHNICAL FIELD

The present invention relates to a heat exchange apparatus which is primarily for use in the manufacture of sugar confectionery and chocolate products. In particular, the invention relates to heat exchanging apparatus which can be adapted to operate either as evaporation apparatus for use in the manufacture of toffee and sugar confectionery or as tempering apparatus for use in the manufacture of chocolate confectionery.

BACKGROUND OF THE INVENTION

In order to manufacture high quality toffee, it is necessary to evaporate water from the ingredient mix continually during the cooking process in order to obtain a fine flavour and consistency in the finished product. In addition, as the ingredients contain a high proportion of sticky milk proteins, which are highly susceptible to burning, it is necessary to agitate the mix continually during cooking in order to prevent it from sticking to the heat transfer surfaces of the vessel and burning. Such agitation is also necessary to produce a fine mix of the ingredients.

While traditionally toffee was manufactured by boiling the toffee ingredients in batches in open vessels, such a method does not lend itself to mass production. Various apparatus are known for the manufacture of toffee by a continuous process.

For example, in EP-A-0 061 232 is disclosed an evaporation apparatus for use in the cooking of toffee wherein a heated closed vessel is continuously fed with an ingredient mix via the base of the vessel and the cooked mix is permitted to overflow over a weir out of the top of the vessel. Rotating paddles within the vessel swirl the ingredient mix into a vortex in order to prevent it sticking to the interior of the vessel. The extremities of the vortex are also urged towards the weir to exit the vessel.

In contrast, in the use of chocolate in the production of confectionery items, it is necessary to temper the molten chocolate mix in order to prevent fat bloom from occurring in the finished product and to give a good appearance to the finished item. Fat bloom is likely to occur when chocolate has been poorly mixed and solidified during production. Tempering of the chocolate is, therefore, carried out to mix the ingredients thoroughly and to control the crystallization of the various fats within the mix. Such tempering is generally achieved by heating the chocolate to melt all fat crystals therein and thereafter controlling its cooling, whilst at the same time stirring or agitating it, so that stable fat crystals are only slowly formed therein.

It is, however, again convenient if chocolate tempering can be carried out as a continuous process within a confectionery manufacturing process as a whole.

SUMMARY OF THE INVENTION

The present invention is intended to provide a heat exchange apparatus which can be used either as an evaporation apparatus or cooker for use in the manufacture of sugar confectionery, such as toffee, or as a tempering apparatus for use in the production of chocolate confectionery.

According to a first aspect of the present invention there is provided a heat exchange apparatus, for example for use in the production of a confectionery or chocolate product, comprising a vessel with a tubular heat transfer surface and defining an inlet and an outlet, heat exchange means for supplying heat to or removing heat from the heat transfer surface, and characterized in that a shaft is located longitudinally along the length of the vessel and is provided with at least one piston, and means are provided for reciprocating said shaft within the vessel whereby substantially said entire heat transfer surface of the vessel is swept by the piston during at least each reciprocation cycle.

Preferably, the heat transfer surface comprises a substantially cylindrical surface.

Preferably also, a plurality of spaced pistons are provided along the length of the shaft whereby on reciprocation of the shaft substantially the entire heat transfer surface of the vessel is swept by the pistons during each reciprocation cycle.

Preferably also, each piston comprises a disc defining at least one hole therethrough.

Advantageously, the vessel comprises a substantially vertical column with the outlet located at a higher level than the inlet.

Preferably also, the heat exchange means are supplied with a heat transfer fluid via a modulating valve.

Preferably also, at least one sensor is provided from which the temperature within the vessel can be deduced and means are provided for controlling operation of the modulating valve to increase or to restrict the rate at which the heat transfer fluid is supplied to the heat exchange means dependent on said temperature. A plurality of sensors may also be provided along the length of the vessel and the heat exchange means adapted to enable a temperature gradient to be set up along the length of the vessel.

According to a second aspect of the present invention there is provided an evaporation apparatus for use in the manufacture of sugar confectionery comprising a vessel with a tubular heat transfer surface and defining an inlet and an outlet higher than the inlet, and heat supply means for supplying heat to the heat transfer surface, and characterised in that a shaft is located longitudinally along the length of the vessel and is provided with a plurality of spaced pistons, and in that means are provided for reciprocating said shaft within the vessel whereby substantially said entire heat transfer surface of the vessel is swept by the pistons during at least each reciprocation cycle.

According to a third aspect of the present invention there is provided a chocolate tempering apparatus comprising a vessel with a tubular heat transfer surface and defining an inlet and an outlet higher than the inlet, and heat exchange means for transferring heat to or from the heat transfer surface, and characterised in that a shaft is located longitudinally along the length of the vessel and is provided with a plurality of spaced pistons, and means are provided for reciprocating said shaft within the vessel whereby substantially said entire heat transfer surface of the vessel is swept by the pistons during at least each reciprocation cycle.

BRIEF DESCRIPTION OF THE DRAWINGS

The present invention will now be described by way of example with reference to the accompanying drawings in which.

DETAILED DESCRIPTION OF THE INVENTION

Figure 1:
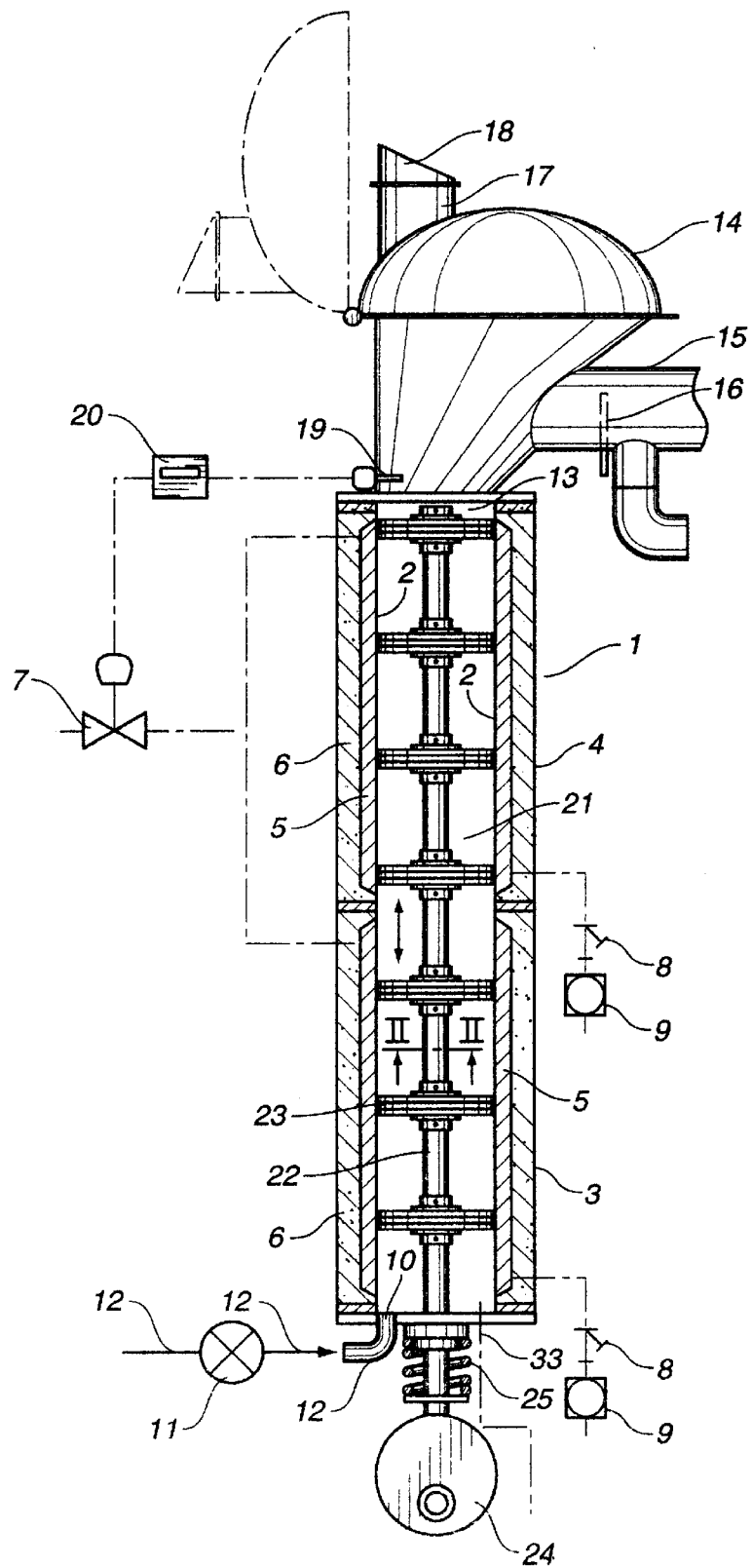
FIG. 1 is a schematic cross-section of a heat exchange apparatus according to the present invention which is adapted for use as a confectionery cooker.

The confectionery cooker shown in FIG. 1 comprises a columnar vessel 1 defining a interior heat transfer surface 2 which is preferably substantially cylindrical, as shown. The vessel 1 is preferably made up of several sections 3, 4, two being the number shown in FIG. 1 but more sections could be used if appropriate. Each of these sections 3, 4 comprises a heating jacket 5 surrounded by heat insulation 6. Each jacket 5 is independently supplied with steam or other heat transfer fluid at a typical pressure of around 10 bar via a modulating valve 7. The steam or other heat transfer fluid exits from each jacket 5 via a suitable strainer 8 and, in the case of steam, a condensate trap 9 from which it or its condensate can be recycled.

The vessel 1 is closed at its base but comprises an inlet 10 at its base to which is connected a premixed supply of ingredients via a reversible metering pump 11 and pipework 12. As is conventional, the ingredients for the confectionery product being manufactured are supplied to the vessel 1 in a premixed form from a holding tank (not shown). The rate of supply is controlled by the operating speed of the metering pump 11, which can be adjusted to regulate the residence time of the product mix within the vessel and therefore the rate at which the product is produced. The pump 11 can also be reversed and operated in an opposite sense if required. Although not part of the evaporation process, it is useful to have this facility to enable the vessel 1 to be drained, for example for maintenance and cleaning purposes.

The top of the vessel 1 is not closed and defines an outlet 13 which is covered by an outlet arrangement 14. The arrangement 14 is hinged to the vessel 1 and, when closed, is sealed against the vessel 1 around the outlet 13. The arrangement thereby comprises a lid which is shaped so as to flare outwardly in an upward direction to increase the surface area of the product mix exiting from the vessel 1 and thereby aid further moisture evaporation therefrom prior to output from the cooker. At one side of the cover 14 is provided a product outlet tube 15 which extends substantially horizontally and then downwardly away from the cooker. Within this tube 15, at the joint between the horizontally and downwardly extending sections is located a weir 16 of adjustable height with respect to the tube 15. In order to exit the cooker, therefore, the product mix must rise sufficiently within the cooker to cascade over the weir 16, the height of which, in conjunction with the operating speed of the metering pump 11, can be used to control the retention time of the product mix within the vessel 1. In general, the height of the weir provides a means of fine adjustment of this retention time.

The upper part of the arrangement 14 also comprises a moisture outlet tube 17 leading to an extraction duct 18 so that moisture and volatile matter are drawn away from the interior of the vessel 1 to enhance further evaporation from the product mix.

For the production of some forms of confectionery it is also advantageous to reduce the pressure within the vessel 1 to cause boiling of the product therein at a lower temperature. It will be appreciated that in these cases, it is possible to modify the outlet arrangement 14 to include a means for the vacuum extraction of the vapor therein to reduce the pressure within the vessel 1.

At the vessel outlet 13, just inside the cover arrangement 14, is located a temperature probe 19 which is linked to the modulating valve 7 via a transducer 20. The temperature of the product exiting from the vessel 1 is an indication of its moisture content and thereby of the degree to which it has been cooked. The signal from the temperature sensor 19 can thus be used to cause operation of the valve 7 to increase or to restrict the rate at which steam or other heat transfer fluid is supplied to the jackets 5 and thereby increase or decrease the temperature of the product mix in order to ensure that sufficient evaporation from the product has occurred. It will be appreciated that the temperature sensor 19 could be replaced by a moisture meter. Likewise, the position of the sensor could be varied, for example it could be located within the product outlet tube 15.

In a modification, a plurality of temperature or moisture sensors 19 can be used, to measure the temperature or moisture level of the product at the different levels within each section 3, 4 of the vessel. In this way, by increasing the number of sections 3, 4 and/or the number of jackets 5 for the vessel 1 as a whole, and by also providing individual modulating valves 7 each linked to a temperature or moisture sensor 18 for each jacket 6, a temperature gradient can be set up within the vessel with the product mix being gradually heated to higher and higher temperatures as it rises within the vessel 1.

In order to prevent the product mix in contact with the heated interior surface 2 of the vessel 1 from being burnt, it is necessary to agitate constantly the product mix within the vessel 1. To this end, an agitator 21 is located within the vessel 1.

The agitator 21 comprises a reciprocable shaft 22 which is located axially within the vessel 1 and runs from its base to its outlet 13. Attached to the shaft 22 at regular intervals along its length is a plurality of pistons 23. The shaft 22 can be reciprocated within the cylindrical column of the vessel 1 by any convenient means, such as, a crank shaft and piston rod arrangement, or a hydraulic or pneumatic piston located beneath the vessel 1 or, as shown in FIG. 1, by a rotary cam arrangement 24 which in combination with spring means 25 operate to a drive the shaft upwards and downwards in the vessel 1. The degree of reciprocation required is directly dependent on the axial spacing of the pistons 23 along the shaft 22. It is important that in use of the vessel 1, the agitator 21 operates so that substantially the entire heat transfer surface 2 of the vessel 1 is swept by the pistons 23 during at least each reciprocation cycle or preferably each half-cycle, as in the present example. In this way none of the product mix can remain in contact with the surface 2 for any length of time sufficient to cause burning of same. Thus, the number and spacing of the pistons 23 is dependent on the distance that is travelled by the shaft during each reciprocation cycle. To some extent, this will be determined by the viscosity of the product mix; the more viscous the product mix, the shorter the travel of the shaft 22 and the greater the number of pistons 23 required. In addition, the rate at which heat is transferred to the product mix is also a function of the speed of reciprocation of the pistons 23 and the rate of reciprocation can be determined accordingly according to the nature of the product mix.

Figure 2:
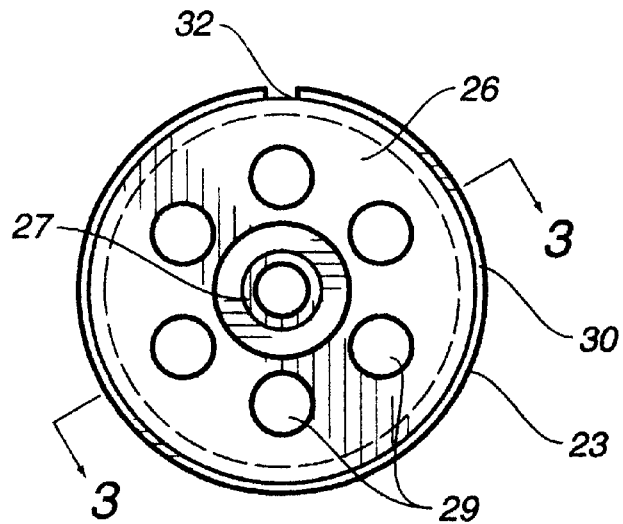
FIG. 2 is a section along the line II—II of FIG. 1 showing, to an enlarged scale one of a plurality of pistons forming part of the invention.
Figure 3:
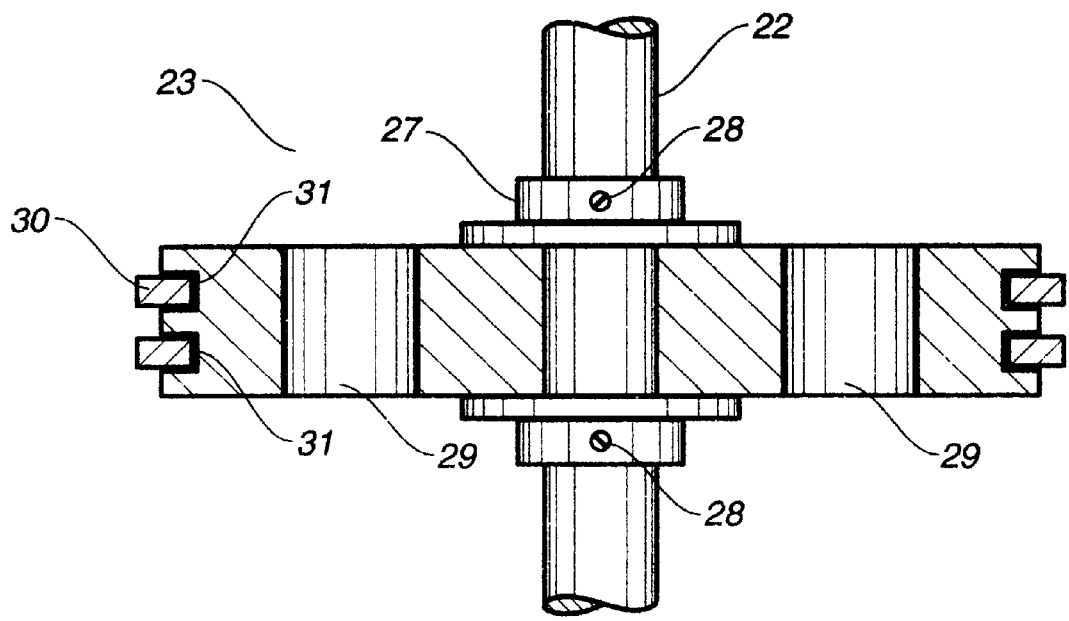
FIG. 3 is a part section along the line indicated in FIG. 2, again to an enlarged scale.

As shown in FIGS. 2 and 3, each of the pistons 23 comprises a disc 26 with a central hub 27 that is either welded to or clamped to the shaft 22, for example in the latter case via clamping screws 28. The pistons 23 are, therefore, readily replaceable when required. The disc 26 of each piston 23 also defines a plurality of circular holes 29, typically six, which are regularly arranged, around the hub 27. These permit the shaft 22 to be reciprocated through the product mix and the product mix to rise up the vessel 1. In addition, as the product mix passes through the holes 29 it is swirled and agitated so that it becomes thoroughly mixed.

Agitation and turbulence within the product mix can also be increased by attaching angled flat bar spacers or fins (not shown) to the surface of the disc 26 and by at least partially rotating the shaft 22 about its longitudinal axis.

Around the rim of each piston 23 is located at least one and preferably two piston rings 30 which act as scrapers. The rings 30 are located in peripheral grooves 31 formed in the rim and form a seal against the cylindrical interior heat transfer surface 2 of the vessel 1. Each ring 30 is not quite annular so that a small gap 32 is left between the ends of the ring 30 but the gaps in each of the two rings 30 of each piston 23 are deliberately not aligned. In this way, no area of the surface 2 is left unswept by the rings 30 during reciprocation of the shaft 22 to ensure that none of the product mix can burn on to the surface 2.

Preferably, while the pistons 23 are made either of stainless steel or a food grade hard plastics material such as polytetrafluoroethylene (PTFE), the rings 30 are usually be formed from a resilient food grade plastics material to enhance their scraping effect.

In a further modification, the cooker can be adapted to aerate the product mix during cooking and/or to create an aerated product. In this case, pressurized air is introduced into the base of the vessel through an inlet pipe 33 at a predetermined rate dependent on the rate of operation of the pump 11. Bubbles of air are then thoroughly incorporated into the product mix by the agitator 21 during cooking.

Turning now to use of the heat exchange apparatus according to the invention as a chocolate tempering apparatus, it will be appreciated that here the vessel 1 is not used for cooking the chocolate mix therein but to control its cooling. The apparatus is, therefore, operated in a different fashion while in construction remaining essentially the same. As, however, evaporation is not required from a chocolate mix, the moisture outlet tube 17 and extraction duct 18 are not required. It will also be appreciated in this regard that in this case the sensors 19 must comprise temperature sensors rather than moisture sensors and that the heat transfer fluid used cannot be steam, which is too hot for chocolate, but is typically water.

With reference to FIG. 1 and as previously referred to, the apparatus is modified by increasing the number of sections 3, 4 and/or the number of jackets 5 for the vessel 1 as a whole, and also by providing individual modulating valves 7 and temperature sensors 19 for each jacket 5. By continuously monitoring the temperature of the chocolate mix as it travels up the vessel 1 and by controlling the temperature of the heat transfer fluid within the jackets 5, a temperature gradient can be set up within the vessel 1.

It is expected that the lowermost section 3 of the vessel 1, will be used to heat the chocolate mix to ensure that it is fully fluid with all fat crystals melted, although alternatively the chocolate mix could be supplied to the vessel in a pre-heated condition. Then, as the chocolate mix rises in the vessel 1 it is progressively cooled by the jackets 5 in order that crystallization of the various fats within the chocolate mix is carefully controlled to ensure a stable end product. At the same time, the vigorous agitation of the chocolate mix by the agitator 21 ensures that individual crystals do not grow too large and that the chocolate mix is well blended. The scraping action of the pistons 23 also ensures that the mix does not stick to the surfaces 2 nor larger crystals form there. Thus a consistent chocolate can be produced with a good temper.

As in the confectionery cooker, when used for chocolate tempering the chocolate mix is intended to overflow from the vessel 1 into the outlet pipe 15 over the weir 16. The height of the weir 16, in conjunction with the operating speed of the metering pump 11, can therefore be used to control the retention time of the chocolate mix within the vessel 1, with the height of the weir providing a means of fine adjustment.

The apparatus can also be used to produce an aerated chocolate product in a similar manner to the confectionery cooker. The air inlet pipe 33 can be used to introduce pressurized air into the base of the vessel 1 at a predetermined rate dependent on the rate of operation of the pump 11. Fine bubbles of air are then thoroughly incorporated into the chocolate mix by the agitator 20 during its cooling.

In both examples described above, the heat exchange apparatus of the invention has advantages over conventional confectionery cookers and chocolate tempering apparatus. The apparatus is compact and of relatively simple construction. The sectional form of the vessel 1 permits it to be both constructed and taken apart for maintenance quickly and easily. In addition, as the agitator 21 is driven from beneath the vessel 1, any danger of contamination of the product within the vessel 1 from, for example, the leakage of oil or other contaminants from the its drive means is avoided. Likewise, the cost of providing shielding means for preventing such contamination is also avoided.

It is anticipated that the vessel 1 will be made, for example, of mild or stainless steel and each section 3, 4 will have an overall length of around 1250 mm and an internal diameter of around 350 mm. However, these dimensions can be varied to suit the particular application of the apparatus. Advantageously, the vessel 1 will be mounted on a stand whereby, when not in use, it can be uncoupled from the various supply and outlet pipes and swivelled from a vertical into a horizontal position. In this way, the agitator 21 can be easily withdrawn from the vessel 1 for maintenance and repair. In addition, it will be possible to modify the form of the agitator 21 to suit various different types of product. For example, the number of the pistons 23 may be altered, as may the size, shape and number of holes 29 therein. More fundamentally, the agitator itself could be altered to suit the production of different types of confectionery products. For example, it is necessary to cook some types of confectionery quickly. In these circumstances, the diameter of the shaft 22 can be increased which will have the effect of increasing the relative quantity of the product mix in contact with the heat transfer surfaces 2. All other things remaining equal, therefore, such a product mix will be cooked faster than would otherwise be the case. In some circumstances, it may also be appropriate to modify the agitator 21 by the use of a hollow shaft 22 through which the heat transfer fluid can also be circulated by a suitable means at an appropriate temperature sufficient to increase heat transfer to or from the product mix but not sufficient to cause burning or excessive cooling of the product mix in contact therewith.

The apparatus could also be modified to operate solely as an aerator for certain products. In these circumstances, the heating jacket 5 and heat insulation 6 can be dispensed with and the agitator 21 simply used to mix the product generally and to mix in bubbles of pressurized air supplied by the air inlet pipe 33. The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A heat apparatus for use in the production of a confectionery or chocolate product comprising a vessel with a tubular heat transfer surface, said vessel defining an inlet and an outlet, heat exchange means for supplying heat to or removing heat from the heat transfer surface, a shaft located longitudinally along a length of the vessel and provided with at least one piston, and means for reciprocating said shaft within the vessel whereby substantially entirely said heat transfer surface of the vessel is swept by the piston during at least each reciprocation cycle, and wherein the heat exchange means are supplied with a heat transfer fluid from a modulating valve, and in that, at least one sensor is interactive with said vessel so as to deduce a temperature within the vessel, and control means are provided for controlling operation of the modulating valve to increase or to restrict a rate at which the heat transfer fluid is supplied to the heat exchange means dependent on said temperature.

2. The apparatus as claimed in claim 1, wherein the heat transfer surface comprises a substantially cylindrical surface.

3. The apparatus as claimed in claim 1, wherein a plurality of spaced pistons are provided along a length of the shaft whereby on reciprocation of the shaft substantially entirely said heat transfer surface of the vessel is swept by the pistons during at least each reciprocation cycle.

4. The apparatus as claimed in claim 3, wherein said heat transfer surface of the vessel is swept by the pistons during each reciprocation half-cycle.

5. The apparatus as claimed in claim 1 wherein each piston comprises a disc defining at least one hole extending therethrough.

6. The apparatus as claimed in claim 1 wherein each piston has at least one piston ring around a rim of said piston.

7. The apparatus as claimed in claim 6, wherein at least two piston rings are provided on each piston, said piston rings having gaps formed between ends of said piston rings around a periphery of said piston, said gaps being offset from one another.

8. The apparatus as claimed in claim 1 wherein the vessel comprises a substantially vertical column with the outlet located at a higher level than the inlet.

9. The apparatus as claimed in claims 1 wherein the shaft is hollow and means are provided for circulating said heat transfer fluid therethrough.

10. The apparatus as claimed in claim 1 wherein a plurality of sensors are provided along the length of the vessel and the heat exchange means are adapted to enable a temperature gradient to be set up along the length of the vessel.

11. The apparatus as claimed in claim 1, wherein each sensor comprises a temperature sensor.

12. The apparatus as claimed in claim 1, wherein each sensor comprises a moisture sensor.

13. The apparatus as claimed in claim 1 wherein means are provided for supplying pressurized air to an interior of the vessel for aeration of the product during production.

14. An evaporation apparatus for use in the manufacture of sugar confectionery comprising a vessel with a tubular heat transfer surface and defining an inlet and an outlet positioned higher than the inlet, and heat supply means for supplying heat to the heat transfer surface, a shaft located longitudinally along a length of the vessel and provided with a plurality of spaced pistons, and means for reciprocating said shaft within the vessel whereby substantially entirely said heat transfer surface of the vessel is swept by the pistons during at least each reciprocation cycle, and wherein the heat supply means are supplied with a heat transfer fluid from a modulating valve, and in that at least one sensor is provided for deducing a temperature within the vessel, and control means are provided for controlling operation of the modulating valve to increase or to restrict a rate at which the heat transfer fluid is supplied to the heat supply means dependent on said temperature.

15. A chocolate tempering apparatus comprising a vessel with a tubular heat transfer surface and defining an inlet and an outlet positioned higher than the inlet, and heat exchange means for transferring heat to or from the heat transfer surface, a shaft located longitudinally along a length of the vessel and provided with a plurality of spaced pistons, and means for reciprocating said shaft within the vessel whereby substantially entirely said heat transfer surface of the vessel is swept by the pistons during at least each reciprocation cycle, and wherein the heat exchange means are supplied with a heat transfer fluid from a modulating valve, and in that at least one sensor is is adapted to deduce a temperature within the vessel and control means are provided for controlling operation of the modulating valve to increase or to restrict the rate at which the heat transfer fluid is supplied to the heat exchange means dependent on said temperature.

* * * * *